United States Patent
Hwang et al.

(10) Patent No.: US 7,601,458 B2
(45) Date of Patent: Oct. 13, 2009

(54) RECHARGEABLE BATTERY AND BATTERY MODULE

(75) Inventors: Duck-Chul Hwang, Yongin-si (KR);
Geun-Bae Kim, Yongin-si (KR);
Yong-Chul Park, Yongin-si (KR);
Won-Il Jung, Yongin-si (KR);
Jong-Hwa Lee, Yongin-si (KR);
Jeom-Soo Kim, Yongin-si (KR);
Euy-Young Jung, Yongin-si (KR)

(73) Assignee: Samsung SDI Co., Ltd., Suwon-si (KR)

( * ) Notice: Subject to any disclaimer, the term of this patent is extended or adjusted under 35 U.S.C. 154(b) by 0 days.

(21) Appl. No.: 11/388,650

(22) Filed: Mar. 24, 2006

(65) Prior Publication Data
US 2006/0216581 A1  Sep. 28, 2006

(30) Foreign Application Priority Data
Mar. 24, 2005  (KR) ............... 10-2005-0024500
Jul. 7, 2005  (KR) ............... 10-2005-0061122

(51) Int. Cl.
*H01M 2/02*  (2006.01)
(52) U.S. Cl. .................... 429/148; 429/176
(58) Field of Classification Search ............. 429/76, 429/120, 148, 176
See application file for complete search history.

(56) References Cited

U.S. PATENT DOCUMENTS

| 4,384,031 | A | * | 5/1983 | Kline ............... 429/176 |
|---|---|---|---|---|
| 5,747,186 | A | | 5/1998 | Morishita et al. |
| 6,033,800 | A | * | 3/2000 | Ichiyanagi et al. ....... 429/176 |
| 6,551,741 | B1 | * | 4/2003 | Hamada et al. ........... 429/151 |
| 6,572,999 | B1 | * | 6/2003 | Stocchiero ............ 429/176 |
| 2001/0004200 | A1 | * | 6/2001 | Sakaue et al. ........... 320/107 |
| 2005/0287426 | A1 | * | 12/2005 | Kim et al. ............ 429/148 X |

FOREIGN PATENT DOCUMENTS

| JP | 6-150963 | 5/1994 |
|---|---|---|
| JP | 7-85847 | 3/1995 |
| JP | 7-296791 | 11/1995 |
| JP | 11-25932 | 1/1999 |
| JP | 2001-229901 | 8/2001 |
| KR | 10-0330607 | 8/2002 |
| KR | 10-2006-0026601 | 3/2006 |
| KR | 10-2006-0037845 | 5/2006 |

OTHER PUBLICATIONS

Patent Abstracts of Japan, Publication No. 06-150963, dated May 31, 1994, in the name of Nobuyuki Yanagihara et al.

(Continued)

*Primary Examiner*—Stephen J. Kalafut
(74) *Attorney, Agent, or Firm*—Christie, Parker & Hale, LLP

(57) ABSTRACT

A rechargeable battery includes an electrode assembly having positive and negative electrodes and a separator interposed between the positive and negative electrodes, a case for receiving the electrode assembly, and a plurality of projections formed on an outer surface of the case.

10 Claims, 12 Drawing Sheets

OTHER PUBLICATIONS

Patent Abstracts of Japan, Publication No. 07-085847, dated Mar. 31, 1995, in the name of Nobuyasu Morishita et al.
Patent Abstracts of Japan, Publication No. 11-025932, dated Jan. 29, 1999, in the name of Keisuke Yamamoto.
Patent Abstracts of Japan, Publication No. 07-296791; Date of Publication: Nov. 10, 1995; in the name of Sadaaki Adachi.
Patent Abstracts of Japan, Publication No. 2001-229901; Date of Publication: Aug. 24, 2001; in the name of Toyohiko Eto.
Korean Patent Abstracts, Publication No. 1020060026601 A; Date of Publication: Mar. 24, 2006; in the name of Yong Sam Kim.
Korean Patent Abstracts, Publication No. 1020060037845 A; Date of Publication: May 3, 2006; in the name of Ju Hyung Kim et al.

* cited by examiner

RS = 125

RS = 150

RS = 175

RS = 200

RS = 225

RS = 250

RS = 275

RS = 300

RS = 400

RS = 600

RS = 1000

RECHARGEABLE BATTERY AND BATTERY MODULE

CROSS-REFERENCES TO RELATED APPLICATION

This application claims priority to and the benefit of Korean Patent Application Nos. 10-2005-0024500 filed on Mar. 24, 2005, and 10-2005-0061122 filed on Jul. 7, 2005, both applications filed in the Korean Intellectual Property Office, the entire contents of which are incorporated herein by reference.

BACKGROUND OF THE INVENTION

1. Field of the Invention

The present invention relates to a rechargeable battery, and more particularly, to a rechargeable battery that is improved in its heat dissipation efficiency and a battery module having such rechargeable batteries.

2. Description of the Related Art

Unlike a primary battery, a rechargeable battery may be recharged. Low capacity batteries are used for various portable electronic devices such as phones, laptop computers, and camcorders. High capacity batteries are used as the power source for driving motors, such as those for hybrid electric vehicles (HEV).

Depending on their external shape, rechargeable batteries may be classified into different types, for example, prismatic and cylindrical batteries.

The high capacity rechargeable battery (hereinafter, referred as "battery module") are composed of a plurality of rechargeable batteries (hereinafter, each referred as "unit battery") so that it can be used to drive motors of machines requiring a high power source such as hybrid electric vehicles. The unit battery includes an electrode assembly having positive and negative electrodes and a separator interposed between the positive and negative electrodes, a case for receiving the electrode assembly, a cap assembly for sealing the case, and positive and negative terminals extending from the cap assembly and electrically connected to the positive and negative electrodes, respectively.

Conductive lead terminals are attached to the respective positive and negative electrodes to collect current and induce the collected current to the positive and negative terminals.

If the unit batteries are prismatic type batteries, the unit batteries are arranged such that the positive and negative terminals of one unit battery alternate with the positive and negative terminals of an adjacent unit battery. The adjacent positive and negative terminals of the adjacent unit batteries are electrically interconnected by conductive members to form the battery module.

The unit battery generates heat during the charge/discharge operation. The heat is generally dissipated to an external side through the case. The heat dissipation property of the unit battery is a very important factor on which the performance of the battery module depends.

When the heat dissipation is not properly realized, an internal temperature of the unit battery increases to deteriorate the performance of the unit battery. Sometime, the increased internal temperature may cause an explosion of the unit battery.

Since the battery module is comprised of several to tens of unit batteries connected in series or parallel, the reaction heat generated from the unit batteries must be more efficiently dissipated.

That is, if heat dissipation of the unit batteries is not properly realized, the internal temperature of the battery module may increase excessively. Accordingly, both the battery module and the device powered by the battery module may malfunction.

Particularly, when the battery module is used as the high capacity rechargeable battery for driving motors of the HEV, the heat dissipation property of the unit battery is of significant importance. That is, since the charge/discharge operation of the battery module is done with a large capacity of current, the internal temperature of the battery module increases excessively. This deteriorates the inherent performance of the battery module.

In addition, internal pressure of the unit battery increases due to internal chemical reaction of the unit battery; The increased internal pressure may deform a shape of the battery unit. This may cause deterioration of the battery performance. For the prismatic battery having a relatively high aspect ratio, such problems become more severe.

To solve the problems, a plurality of barriers are disposed between the unit batteries to provide channels between the unit batteries. As cooling air passes through the channels, the heat generated from the unit batteries is dissipated. However, this structure cannot yet sufficiently dissipate the heat out of the battery module. Furthermore, the battery shape deformation problem caused by the internal chemical reaction is not still solved.

SUMMARY OF THE INVENTION

The present invention provides a rechargeable battery having a case that is improved to maximize the heat dissipation area and a battery module having such rechargeable batteries.

According to one embodiment of the present invention, there is provided a rechargeable battery including an electrode assembly having positive and negative electrodes and a separator interposed between the positive and negative electrodes; a case for receiving the electrode assembly; and a plurality of projections formed on an outer surface of the case.

The projections may be random in terms of a size, shape and arrangement thereof.

Each of the projections may have a circular or rectangular section.

Alternatively, the projections may be uniformly arranged in a predetermined pattern.

Preferably, the projections are distributed throughout the outer surface.

The case may be prismatic or cylindrical.

The projections may be integrally formed with the case.

The projections are formed such that a relative area of the outer surface of the case is about 150 or more when it is assumed that an area of a case having an even outer surface is 100.

Preferably the relative area may be in the range from 150 to 1000, more preferably, the relative area may be in the range from 175 to 1000.

According to another aspect of the present invention, there is provided a battery module including a housing having an inlet for introducing cooling air and an outlet for exhausting the introduced cooling air; and a plurality of unit batteries disposed in the housing, each unit battery having a case whose outer surface is provided with a plurality of projections.

The battery module may further include barriers interposed between the unit batteries such that gaps are defined between the barrier and the unit battery by the projections.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION

The present invention will now be described more fully with reference to the accompanying drawings, in which exemplary embodiments of the invention are shown. This invention may, however, be embodied in many different forms and should not be construed as being limited to the embodiments set forth herein; rather, these embodiments are provided so that this disclosure will be through and complete, and will fully convey the concept of the invention to those skilled in the art.

Figure 1:
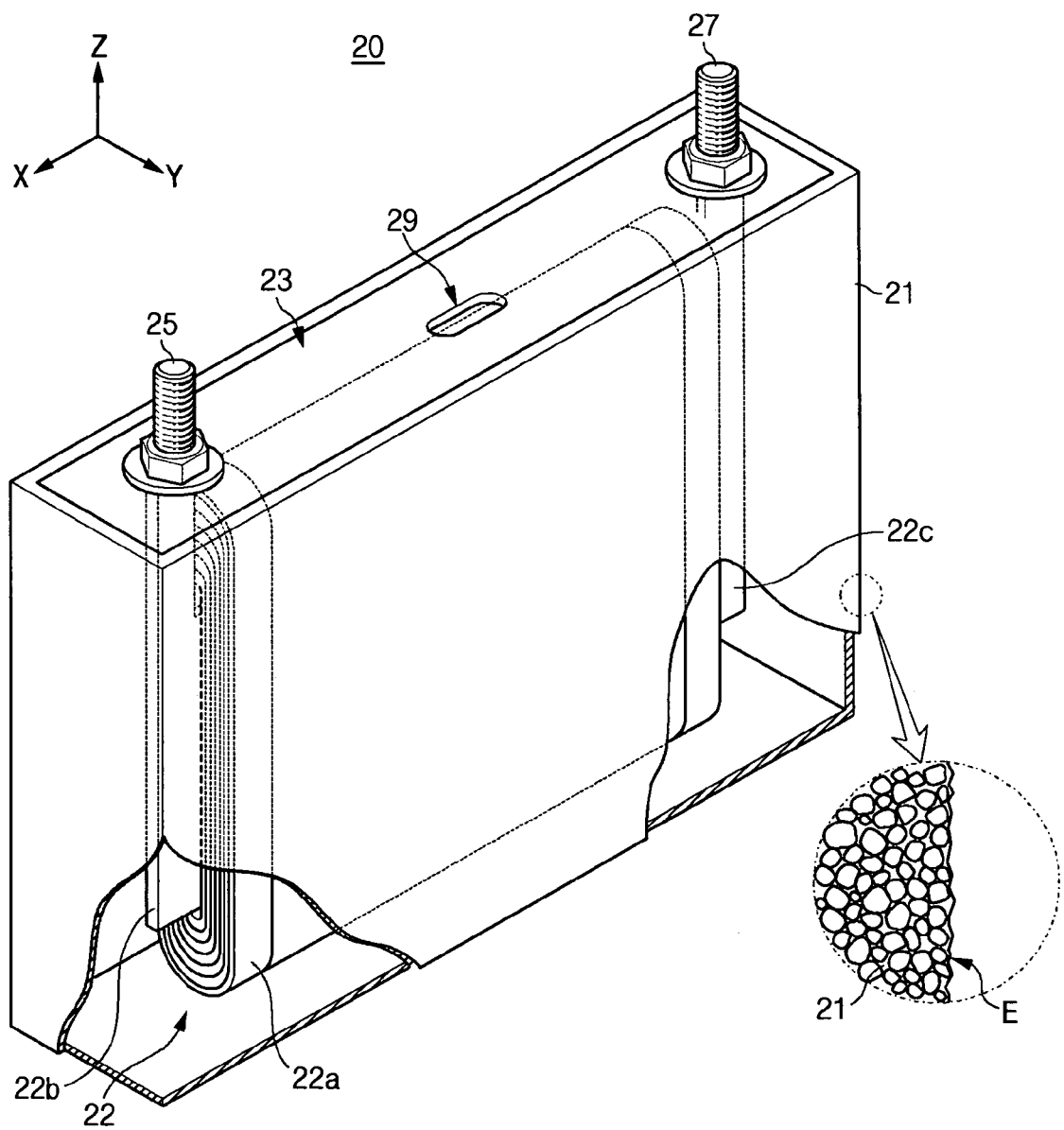
FIG. 1 is a perspective view of a rechargeable battery according to an exemplary embodiment of the present invention.

FIG. 1 shows a rechargeable battery according to an exemplary embodiment of the present invention;

A rechargeable battery 20 of this embodiment is a prismatic rechargeable battery including a rectangular hexahedral case 21, an electrode assembly 22 received in the case 21, a cap plate 23 for sealing an opening of the case 21. The electrode assembly 22 includes positive and negative electrodes 22b and 22c and a separator 22a formed of an insulation material and interposed between the positive and negative electrodes 22b and 22c. An outer surface of the case 21 is roughly processed such that fine projections E can be formed on the outer surface.

The positive and negative electrodes 22b and 22c of the electrode assembly 22 are electrically connected to positive and negative terminals 25 and 27 mounted on the cap plate 23, respectively.

The cap plate 23 is formed in a shape corresponding to the opening of the case 21. The positive and negative terminals 25 and 27 are projected to an external side through holes formed on the cap plate 23.

The cap plate 23 is provided with a thin portion 29 that will be broken when inner pressure of the rechargeable battery 20 increases above a predetermined level to prevent the rechargeable battery 20 from exploding.

The case 21 may be formed of a conductive material such as aluminum, an aluminum alloy or steel plated with nickel. Alternatively, the case 21 may be formed of an insulation material such as a polyethylene, polypropylene or polytetrafluorethylene.

As shown in a circled portion of FIG. 1, the outer surface of the case 21 is roughly processed to have the fine projections E. Therefore, a contact area of the case 21 with external air increases.

In this embodiment, the projections are different in a size and a shape. The roughness of the outer surface of the case is not limited to a predetermined degree.

Alternatively, the projections E may be separately prepared and attached on the outer surface of the case 21. In this case, the projections E are formed of a material identical to that of the case 21 or a material having a thermal conductivity higher than that of the case 21.

As the projections E are formed on the surface of the case 21, the contact area of the case 21 with cooling air thereby more effectively dissipates reaction heat generated from the electrode assembly.

Figure 2:
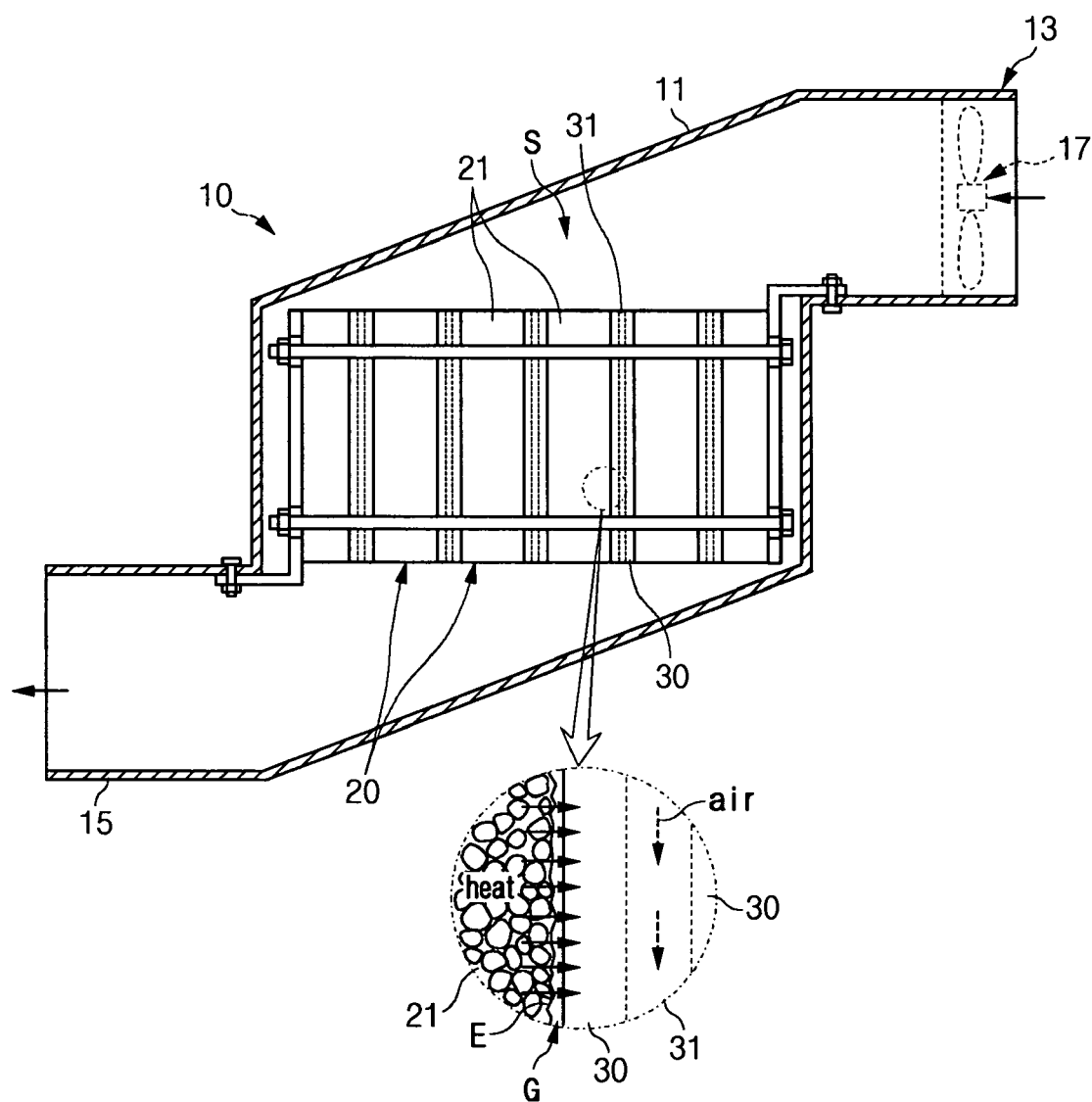
FIG. 2 is a schematic view of a battery module, to which the rechargeable batteries of FIG. 1 are applied as unit batteries, according to an exemplary embodiment of the present invention.

FIG. 2 is a schematic view of a battery module, to which the rechargeable battery of FIG. 1 is applied as a unit battery, according to an exemplary embodiment of the present invention.

Referring to FIG. 2, a battery module of this embodiment includes a housing 11 defining an internal space S and having an inlet 13 and outlet 15 for the cooling air. A blower fan 17 is installed near the inlet 13 in the housing.

The unit batteries 20 are installed in the space S of the housing 11. As described with reference to FIG. 1, each unit battery 20 has projections E formed on the outer surface thereof.

A barrier 30 is disposed between the adjacent unit batteries 20. Air passages are formed through the barrier 30 to allow the cooling air to flow between the adjacent batteries. The barrier 30 also functions to support side surfaces of the unit batteries 20.

Furthermore, since the projections are formed on the outer surfaces of the case 21 of the unit batteries 20, gaps G are formed between the barrier 30 and the case 21. Therefore, the cooling air introduced through the inlet 13 passes through the air passages 31 formed through the barrier 30 as well as through the gaps G, thereby dramatically increasing the heat dissipation efficiency. The projections E formed on the unit battery 20 are formed of a heat conductive material.

That is, the cooling air is introduced into the housing 11 through the inlet 13 by the operation of the blower fan 17 and passes through the air passages 31 formed through the barriers 30 between the unit batteries 20 as well as through the gaps defined between the unit batteries 20 and the barriers 30, in the course of which the cooling air absorbs the reaction heat generated from the unit batteries 20. The cooling air is then exhausted through the outlet 15.

Figure 3:
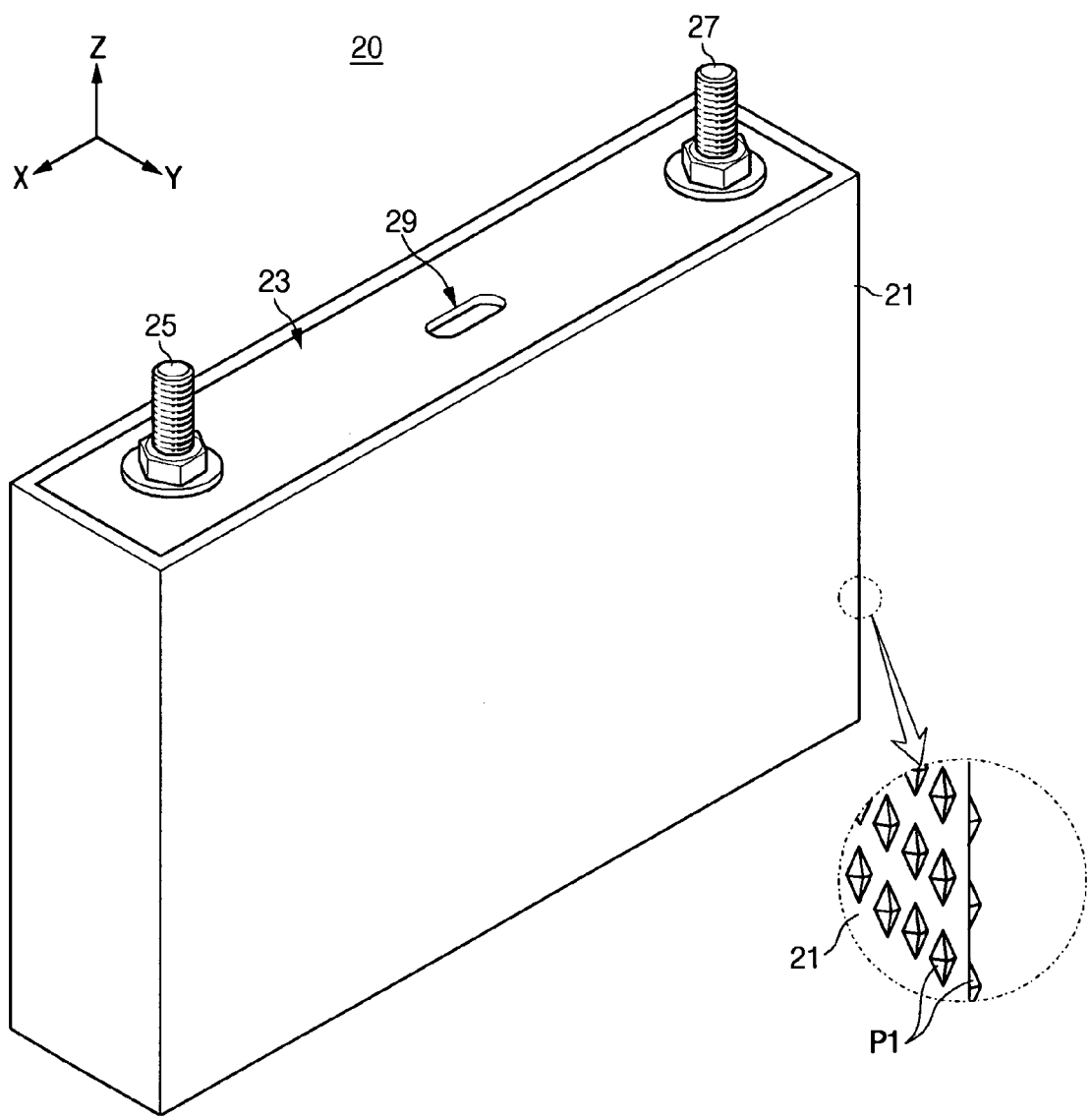
FIG. 3 is a perspective view of a rechargeable battery according to another exemplary embodiment of the present invention.

FIG. 3 shows a rechargeable battery according to another exemplary embodiment of the present invention.

A rechargeable battery 20 of this embodiment is a prismatic rechargeable battery including a rectangular hexahedral case 21, an electrode assembly (not shown) received in the case 21, a cap plate 23 for sealing an opening of the case 21. The electrode assembly 22 includes positive and negative electrodes 22b and 22c and a separator 22a formed of an insulation material and interposed between the positive and negative electrodes 22b and 22c. A plurality of fine projections P1 are arranged on an outer surface of the case 21.

That is, in order to increase a contact area of the outer surface of the case 21 with external air, the fine projections P1 are arranged on the outer surface of the case 21 in a predetermined pattern. The fine projections P1 are spaced apart from each other and formed in a quadrangular pyramid shape including a diamond pyramid shape. The projections P1 may be integrally formed with the case 21. Alternatively, the projections P1 are separately prepared and attached on the case 21. In this case, the projections P1 are formed of a material identical to that of the case 21 or a material having a thermal conductivity higher than that of the case 21.

Figure 4:
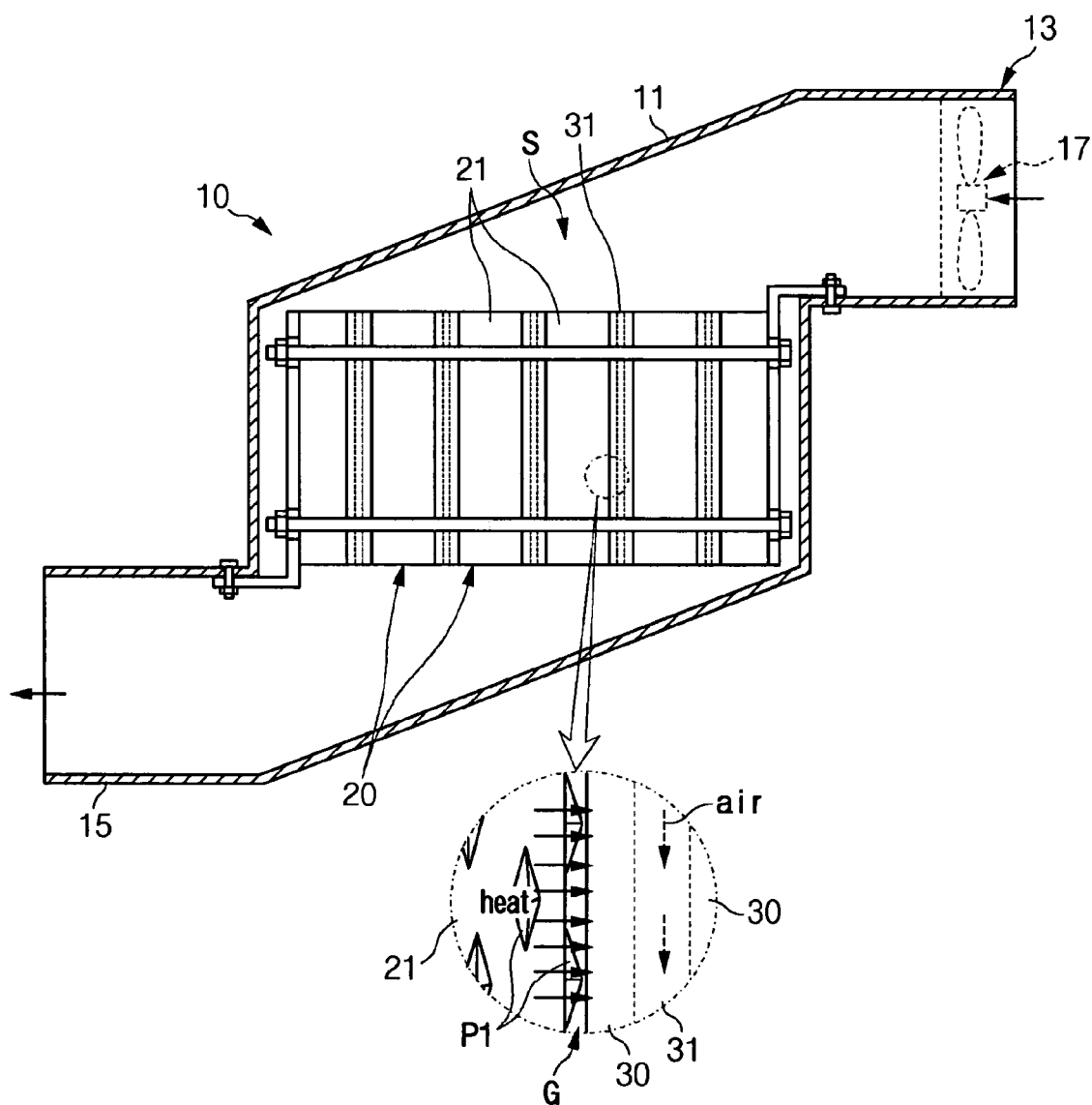
FIG. 4 is a schematic view of a battery module, to which the rechargeable batteries of FIG. 3 are applied as unit batteries, according to another exemplary embodiment of the present invention.

FIG. 4 is a schematic view of a battery module, to which the rechargeable batteries of FIG. 3 are applied as unit batteries, according to another exemplary embodiment of the present invention;

Likewise the embodiment of FIG. 3, gaps G are defined between a case 21 of each unit battery and a barrier 30 by the projections P1 arranged on the outer surface of the case 21 in the predetermined pattern, thereby improving the cooling efficiency.

Figure 5:
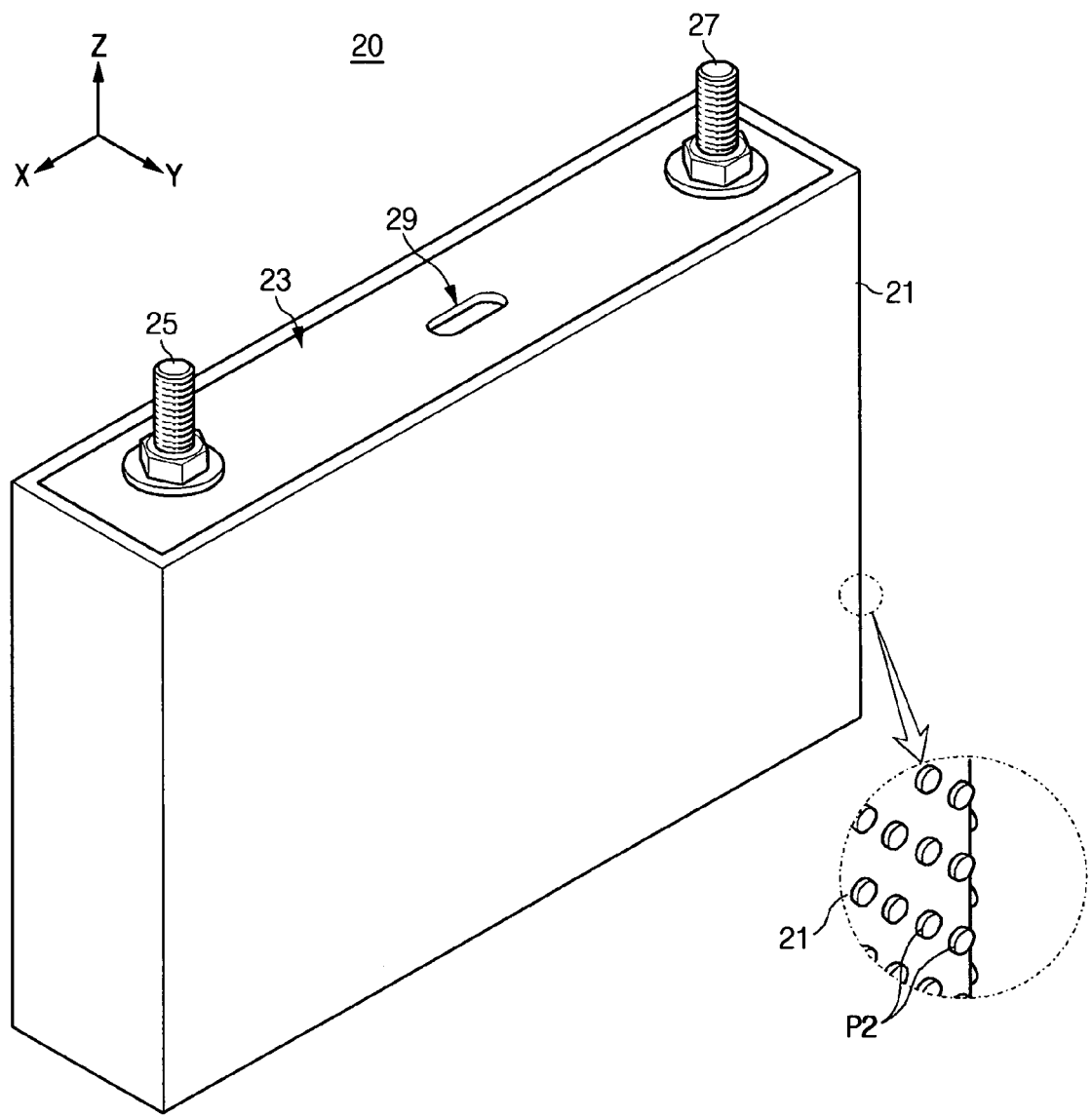
FIG. 5 is a perspective view of a rechargeable battery according to another exemplary embodiment of the present invention.

FIG. 5 shows a rechargeable battery according to another exemplary embodiment of the present invention.

A rechargeable battery 20 of this embodiment is a prismatic rechargeable battery including a rectangular hexahedral case 21, an electrode assembly (not shown) received in the case 21, a cap plate 23 for sealing an opening of the case 21. The electrode assembly 22 includes positive and negative electrodes 22b and 22c and a separator 22a formed of an insulation material and interposed between the positive and negative electrodes 22b and 22c. A plurality of fine projections P2 are arranged on an outer surface of the case 21.

That is, in order to increase a contact area of the outer surface of the case 21 with external air, the fine projections P2 are arranged on the outer surface of the case 21 in a predetermined pattern. The fine projections P2 are spaced apart from each other and formed in a circular cylinder shape. The projections P2 may be integrally formed with the case 21. Alternatively, the projections P2 are separately prepared and attached on the case 21. In this case, the projections P2 are formed of a material identical to that of the case 21 or a material having a thermal conductivity higher than that of the case 21.

Figure 6:
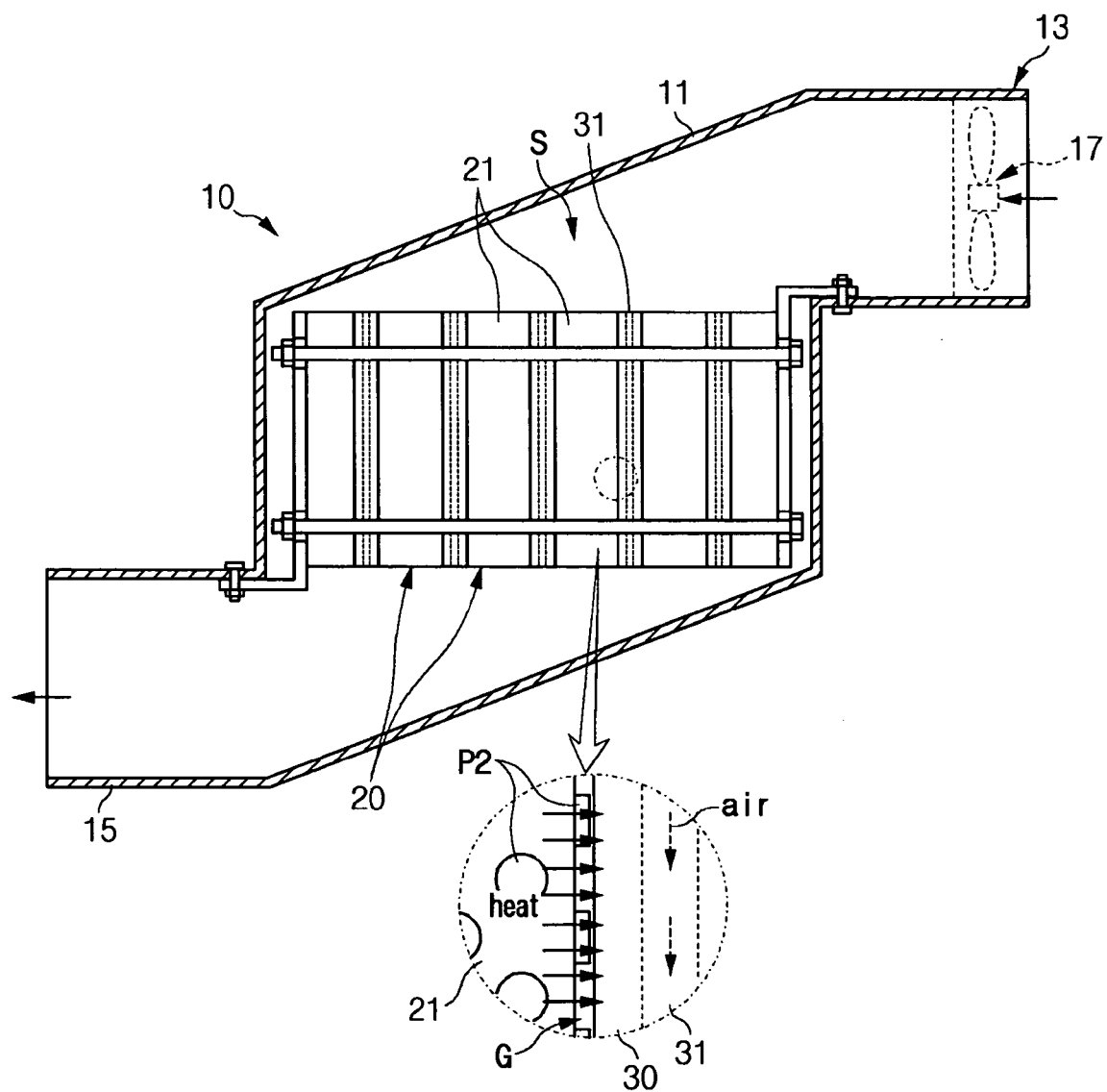
FIG. 6 is a schematic view of a battery module, to which the rechargeable batteries of FIG. 5 is applied as unit batteries, according to another exemplary embodiment of the present invention.

FIG. 6 is a schematic view of a battery module, to which the rechargeable batteries of FIG. 5 are applied as unit batteries, according to another exemplary embodiment of the present invention;

Likewise the embodiments of FIGS. 3 and 5, gaps G are defined between a case 21 of each unit battery and a barrier 30 by the projections P2 arranged on the outer surface of the case 21 in the predetermined pattern, thereby improving the cooling efficiency.

Figure 7:
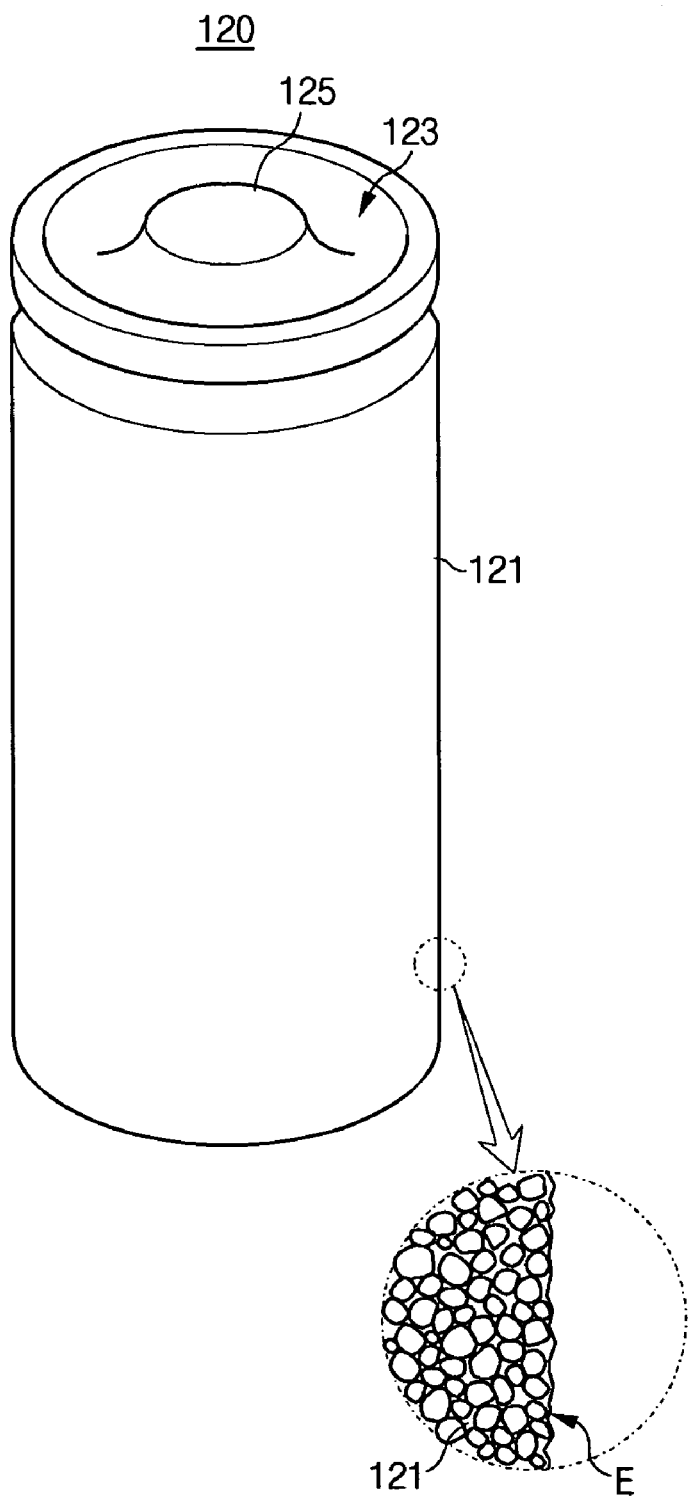
FIG. 7 is a perspective view of a rechargeable battery according to another exemplary embodiment of the present invention.

FIG. 7 shows a rechargeable battery according to another exemplary embodiment of the present invention;

A rechargeable battery 120 of this embodiment is a cylindrical rechargeable battery including a cylindrical case 121, an electrode assembly (not shown) received in the case 121, a cap assembly 123 for sealing an opening of the case 121. The electrode assembly includes positive and negative electrodes and a separator formed of an insulation material and interposed between the positive and negative electrodes. An outer surface of the case 121 is roughly processed such that fine projections E can be formed on the outer surface.

An outer terminal 125 is electrically connected to the positive electrode of the electrode assembly and projected outward from the cap assembly 123.

The case 121 may be formed of a conductive material such as aluminum, an aluminum alloy or steel plated with nickel.

As shown in a circled portion of FIG. 7, the outer surface of the case 121 is roughly processed to have the fine projections E. Therefore, a contact area of the case 121 with external air increases.

In this embodiment, the projections are different in a size and a shape. The roughness of the outer surface of the case is not limited to a predetermined degree.

As the projections E are formed on the surface of the case 121, the contact area of the case 121 with cooling air thereby more effectively dissipates reaction heat generated from the electrode assembly.

Figure 8:
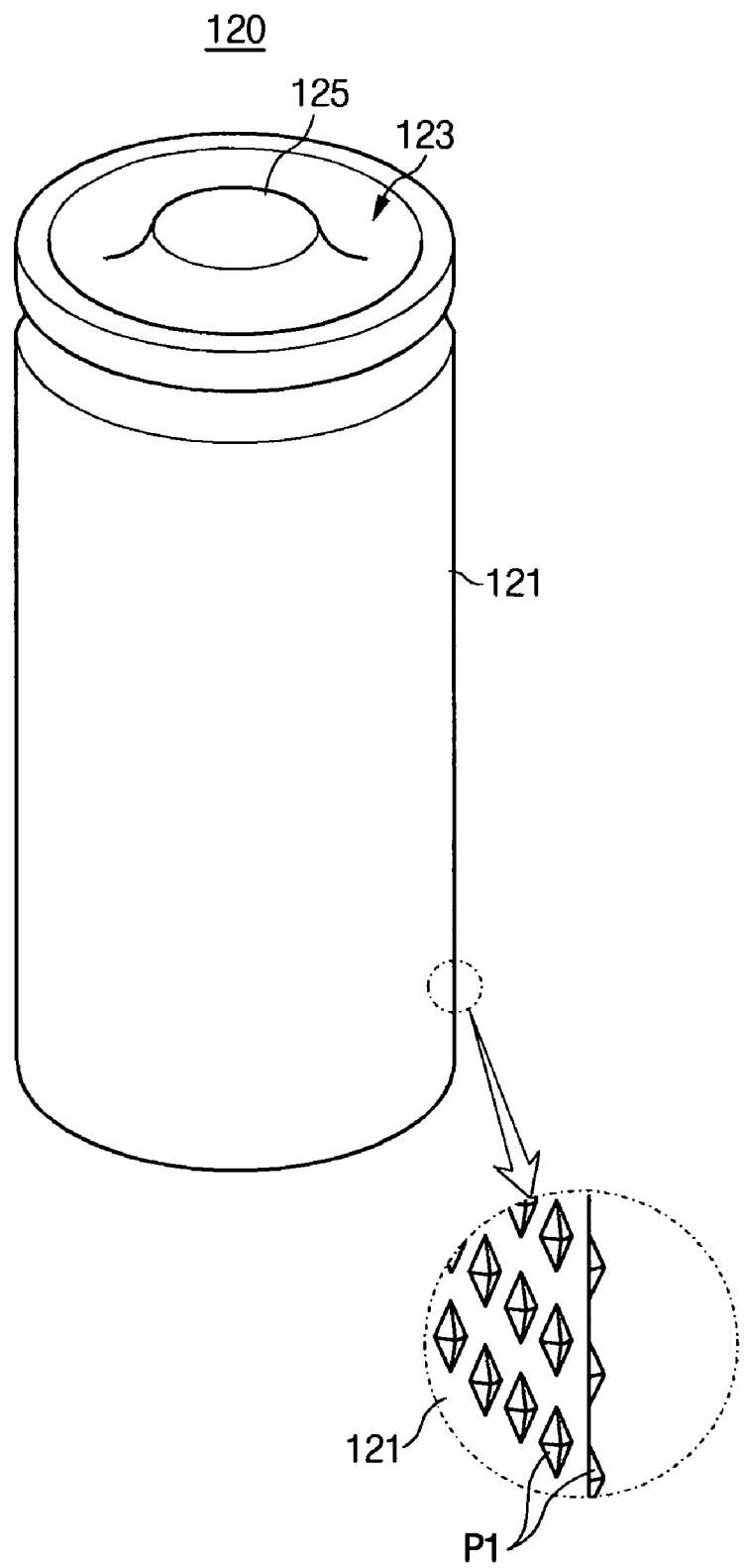
FIG. 8 is a perspective view of a rechargeable battery according to another exemplary embodiment of the present invention.

FIG. 8 shows a rechargeable battery according to another exemplary embodiment of the present invention.

A rechargeable battery 120 of this embodiment has a cylindrical case 121. A plurality of fine projections P1 are arranged on an outer surface of the case 121.

That is, in order to increase a contact area of the outer surface of the case 121 with external air, the fine projections P1 are arranged on the outer surface of the case 121 in a predetermined pattern. The fine projections P1 are spaced apart from each other and formed in a quadrangular pyramid shape including a diamond pyramid shape. The projections P1 may be integrally formed with the case 121.

Figure 9:
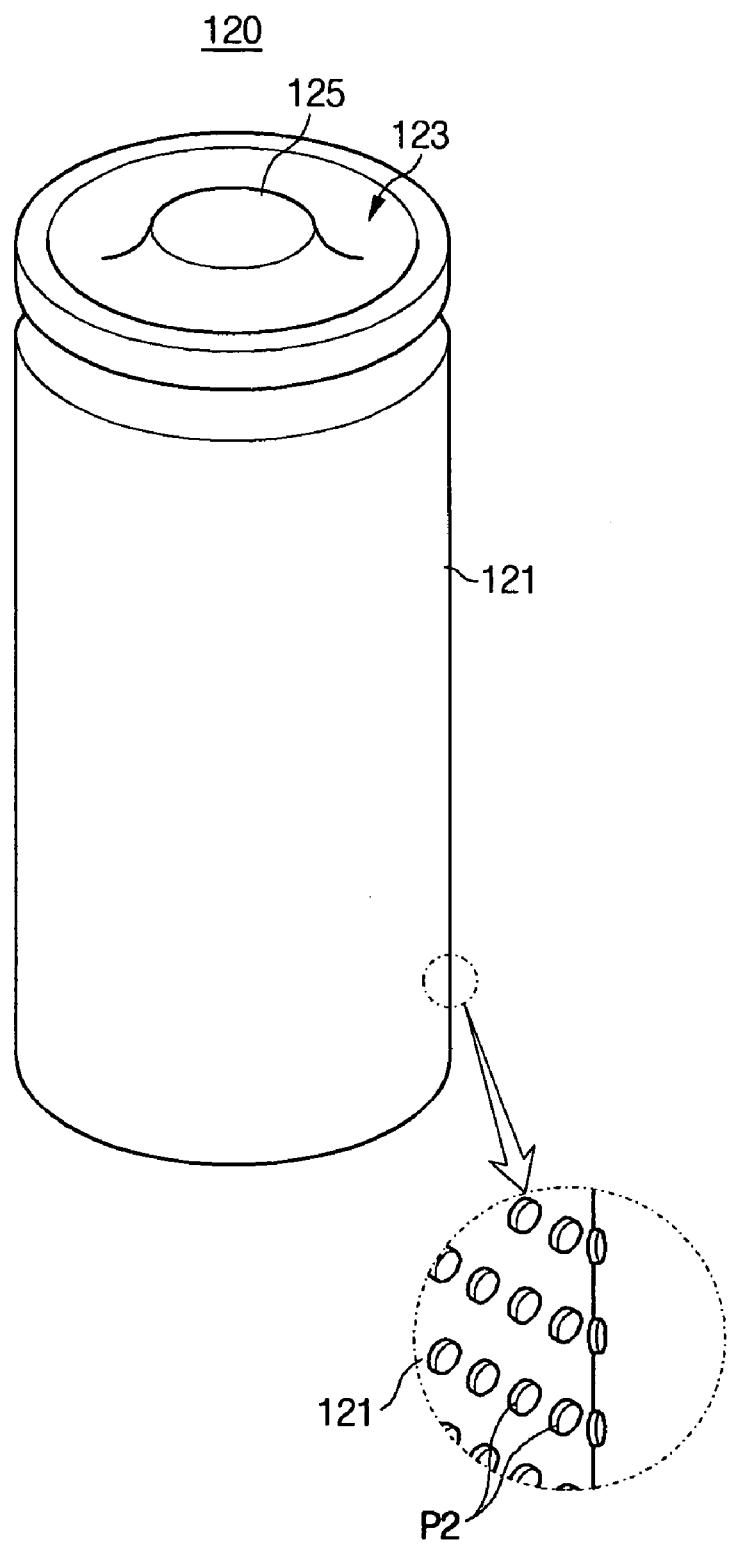
FIG. 9 is a perspective view of a rechargeable battery according to another exemplary embodiment of the present invention.

FIG. 9 shows a rechargeable battery according to another exemplary embodiment of the present invention.

A rechargeable battery 120 of this embodiment has a cylindrical case 121. A plurality of fine projections P2 are arranged on an outer surface of the case 121.

That is, in order to increase a contact area of the outer surface of the case 121 with external air, the fine projections P2 are arranged on the outer surface of the case 121 in a predetermined pattern. The fine projections P2 are spaced apart from each other and formed in a circular cylinder shape.

EXPERIMENTAL EXAMPLES

Eleven rechargeable batteries (examples 1 through 11) were prepared according to the embodiment of FIG. 5. These rechargeable batteries (example 1 through 11) were compared with the prior art rechargeable battery (comparative example 1) having an even outer surface.

In order to prepare a positive electrode of the rechargeable batteries, $LiGoO_2$ was used as a positive active material, PVDF was used as binder, Super-P was used as a conductive material, and NMP was used as solvent. The positive active material, binder and conductive material were mixed with each other at a weight ratio of 94:3:3. Slurry was prepared by dissolving the mixture in the solvent. The slurry was coated on an aluminum current collector and dried. Then, the positive electrode was prepared by pressing the aluminum current collector.

In order to prepare a negative electrode, carbon was used as a negative active material, PVDF was used as binder, and NMP was used as solvent. The negative active material and the binder were mixed with each other at a weight ratio of 94:6. Slurry was prepared by dissolving the mixture in the solvent. The slurry was coated on a copper current collector and dried. The negative electrode was prepared by pressing the copper current collector.

Using the positive and negative electrodes, eleven prismatic rechargeable batteries each having a thickness of 46 mm, a width of 34 mm and a length of 500 mm were manufactured. At this point, 1.0 M LiPF$_6$ EC/DMC/EMC(3/3/4) was used as electrolyte.

The examples and the comparative example 1 were tested by being overcharged with 1.0 C.

The experimental results are shown in the following Table 1.

TABLE 1

| | Relative surface area (RS) | Battery capacity | Service life at normal temperature - 300 times [%] | Service life at high temperature (60° C.) - 300 times[%] | Charged with 4.2 V and penetration | Over charged with 4.35 V and penetration | Overcharged with 1.0 C |
|---|---|---|---|---|---|---|---|
| Comparative Example 1 | 100 | 900 | 70 | 46 | Fire | Fire | Fire |
| Example 1 | 125 | 900 | 71 | 53 | Fire | Fire | Fire |
| Example 2 | 150 | 900 | 73 | 57 | Not fire | Fire | Not fire |
| Example 3 | 175 | 900 | 75 | 64 | Not fire | Not fire | Not fire |
| Example 4 | 200 | 900 | 76 | 66 | Not fire | Not fire | Not fire |
| Example 5 | 225 | 900 | 77 | 68 | Not fire | Not fire | Not fire |
| Example 6 | 250 | 900 | 79 | 71 | Not fire | Not fire | Not fire |
| Example 7 | 275 | 900 | 80 | 72 | Not fire | Not fire | Not fire |
| Example 8 | 300 | 900 | 81 | 73 | Not fire | Not fire | Not fire |
| Example 9 | 400 | 900 | 82 | 73 | Not fire | Not fire | Not fire |
| Example 10 | 600 | 900 | 82 | 73 | Not fire | Not fire | Not fire |
| Example 11 | 1000 | 900 | 82 | 73 | Not fire | Not fire | Not fire |

Projections P2 different in a length from each other were formed on outer surfaces of the prismatic rechargeable batteries, thereby preparing the examples 1 through 11. These examples were compared with comparative example 1 that is the prior art rechargeable battery having an even outer surface.

FIGS. 10A through 10K are schematic sectional views of outer surfaces of the examples 1 through 11, that are different in a relative surface area from each other.

A relative surface area (RS) means a relative value when a surface area of the comparative example was 100.

Figure 10A:
FIGS. 10A through 10K are schematic sectional views of outer surfaces of the examples 1 through 11 that are different in a relative surface area from each other.
Figure 10B:
Figure 10C:
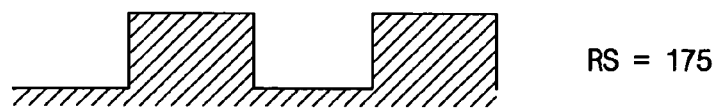
Figure 10D:
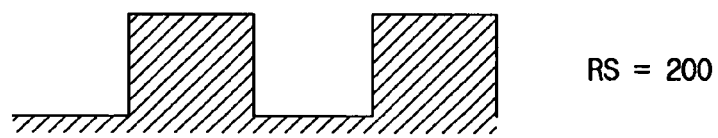
Figure 10E:
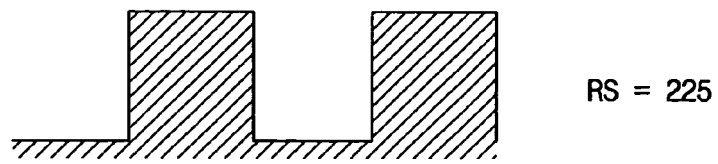
Figure 10F:
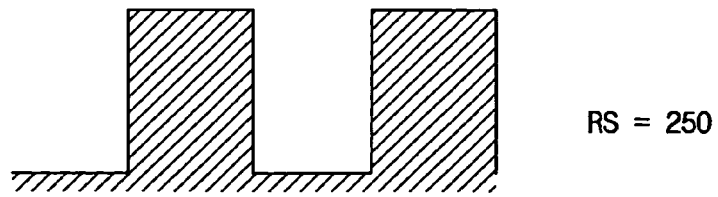
Figure 10G:
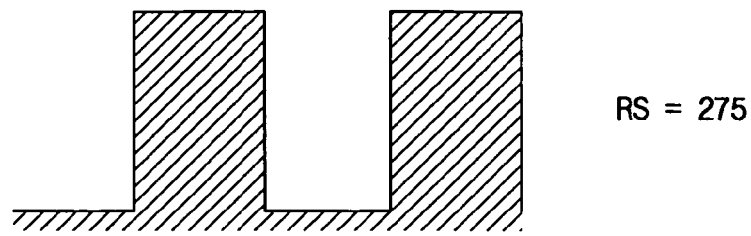
Figure 10H:
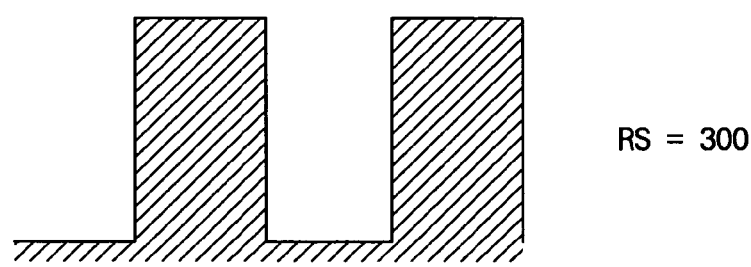
Figure 10I:
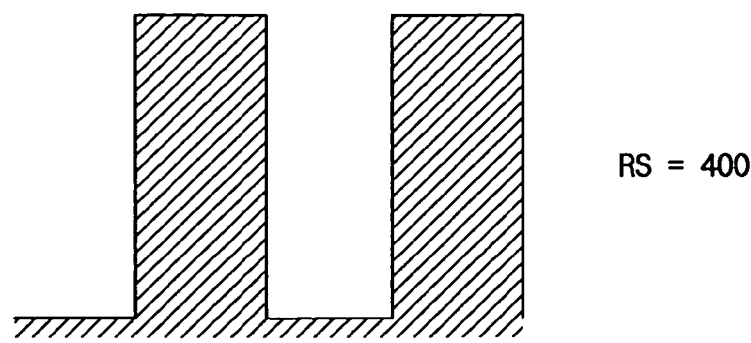
Figure 10J:
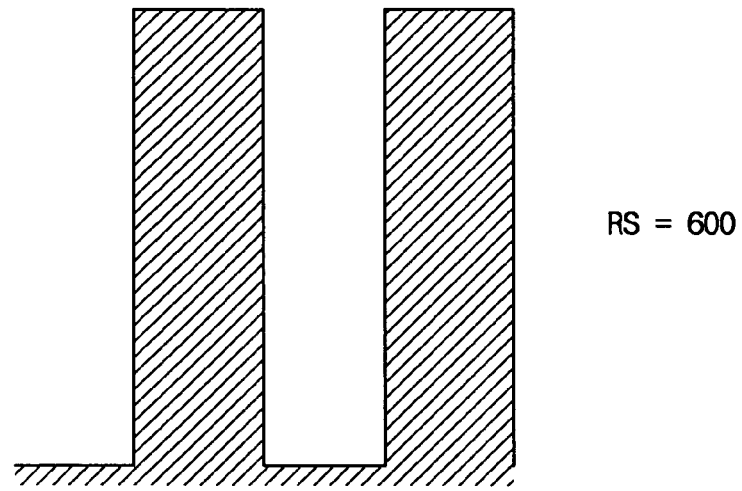
Figure 10K:
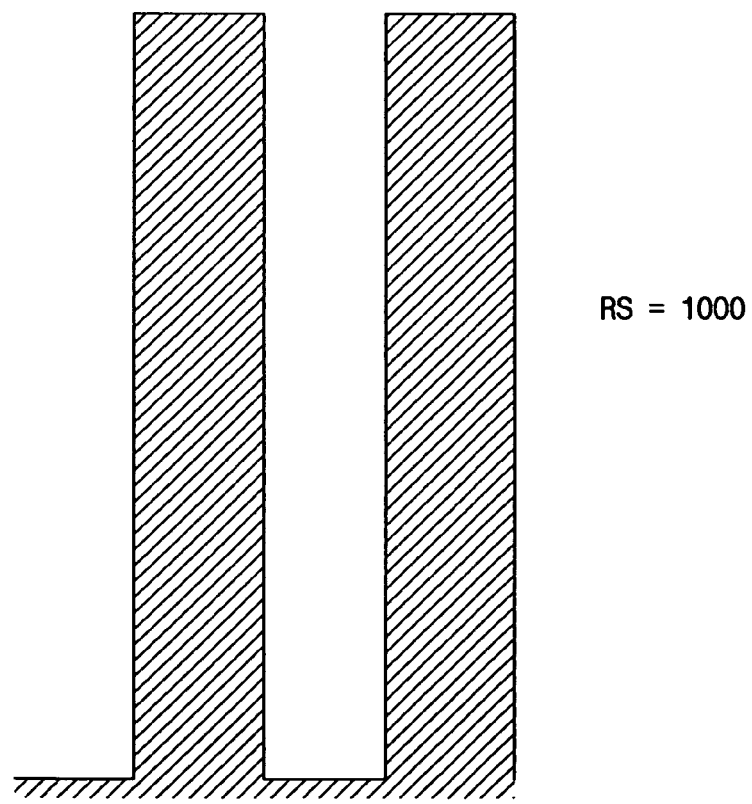

The projections were formed on the examples 1 through 11 such that a relative surface area RS of the first example is 125 (see FIG. 10A), a relative surface area RS of the second example is 150 (see FIG. 10B), a relative surface area RS of the third example is 175 (see FIG. 10C), a relative surface area RS of the fourth example is 200 (see FIG. 10D), a relative surface area RS of the fifth example is 225 (see FIG. 10E), a relative surface RS of the sixth example is 250 (see FIG. 10F), a relative surface area RS of the seventh example is 275 (see FIG. 10G), a relative surface area RS of the eighth example is 300 (see FIG. 10H), a relative surface area RS of the ninth example is 400 (see FIG. 10I), a relative surface area RS of the tenth example is 600 (see FIG. 10J) and a relative surface area RS of the eleventh example is 1000 (see FIG. 10K).

The rechargeable batteries were charged and discharged with 0.2 C one time and further charged and discharged with 0.5 C and 0.2 C, respectively, one time. The capacity means a depth of discharge of a standard process.

A series of experiments were performed for the examples 1 through 11 and the comparative example.

That is, the examples and the comparative example 1 were tested by being charged and discharged 300 times with 1.0 C at the normal temperature.

The examples and the comparative example 1 were tested by being charged and discharged 300 times with 1.0 C at a temperature of 60° C.

The examples and the comparative example 1 were tested by being charged with 4.2V and penetrated.

The examples and the comparative example 1 were tested by being overcharged with 4.35V and penetrated.

As can be noted from the Table 1, the examples manufacture according to the present invention is superior to the comparative example 1 in terms of the service life and safety.

It can be further noted than when the relative surface area is more than 1.5 times (examples 2 through 11), preferably, 1.75 times that of the comparative example 1, the safety the batteries can be more improved. That is, since the heat generated in the batteries of the examples 2 through 11 can be more effectively dissipated, an accident such as fire caused when excessive impact is applied to the battery can be prevented.

When the relative surface area is more than 1000, since the overall volume of the battery excessively increases, the battery may not meet the standard.

Although the examples 1 through 11 are made in accordance with the embodiment of FIG. 5, it will be appreciated by those skilled in the art that the identical effect can be obtained even when the examples are made in accordance with other embodiments.

The battery modules according to the foregoing embodiments can be used as the power source for driving motors, such as those for hybrid electric vehicles, electric vehicles, electric scooters, electric bicycles, wireless vacuum cleaners, or the like.

Although exemplary embodiments of the present invention have been shown and described, it will be appreciated by those skilled in the art that changes may be made in this embodiment without departing from the principles and spirit of the invention, the scope of which is defined in the claims and their equivalents.

For example, the structures of the projections are not limited to the above-described embodiments. That is, the projections may be formed in, for example, a rectangular cylinder shape.

What is claimed is:

1. A rechargeable battery comprising:
    an electrode assembly having a positive electrode and negative electrode and a separator between the positive electrode and the negative electrode;
    a case for receiving the electrode assembly; and
    a plurality of projections attached on an outer surface of the case, the projections having a random size and shape, wherein when an area of a case having an even outer surface is considered to be 100, the projections are formed such that a relative area of the outer surface of the case is in a range from 175 to 1000.

2. The rechargeable battery of claim 1, wherein the projections are random in terms of an arrangement thereof.

3. The rechargeable battery of claim 1, wherein at least one of the projections has a circular section.

4. The rechargeable battery of claim 1, wherein at least one of the projections has a rectangular section.

5. The rechargeable battery of claim 1, wherein the projections are uniformly arranged in a predetermined pattern.

6. The rechargeable battery of claim 1, wherein the projections are distributed throughout the outer surface.

7. The rechargeable battery of claim 1, wherein the case is prismatic.

8. The rechargeable battery of claim 1, wherein the case is cylindrical.

9. The rechargeable battery of claim 1, wherein the projections are formed of a material identical to that of the case.

10. The rechargeable battery of claim 1, wherein the projections are formed of a material having a thermal conductivity higher than that of the case.

* * * * *